United States Patent [19]

Kravette et al.

[11] Patent Number: 5,077,582
[45] Date of Patent: Dec. 31, 1991

[54] PHOTOCOPY MONITORING SYSTEM

[75] Inventors: Burt Kravette, Bayside, N.Y.;
Thomas Heidt, Long Valley, N.J.;
Stephen Trapp, Huntington, N.Y.;
Leonard Tarr, Woodbury, N.Y.;
James C. Wickstead, Mendham;
Roger Booth, Chester, both of N.J.

[73] Assignee: Monitel Products Corp., Cedar Knolls, N.J.

[21] Appl. No.: 341,018

[22] Filed: Apr. 20, 1989

Related U.S. Application Data

[63] Continuation-in-part of Ser. No. 194,710, May 17, 1988, abandoned.

[51] Int. Cl.$^5$ .............................................. G03G 15/00
[52] U.S. Cl. ...................................... 355/206; 355/209
[58] Field of Search ............... 355/202, 203, 204, 205, 355/209, 309, 206

[56] References Cited

U.S. PATENT DOCUMENTS

| | | |
|---|---|---|
| 3,638,191 | 1/1968 | Mann . |
| 3,656,145 | 3/1969 | Proops . |
| 3,842,408 | 8/1972 | Wells . |
| 3,858,181 | 10/1973 | Goldsby et al. . |
| 3,984,032 | 5/1974 | Hyde et al. . |
| 3,997,873 | 12/1976 | Thornton . |
| 4,071,911 | 4/1976 | Mazur . |
| 4,124,887 | 4/1977 | Johnson et al. . |
| 4,144,550 | 5/1977 | Donohue et al. . |
| 4,167,322 | 9/1977 | Yano . |
| 4,199,100 | 6/1978 | Wostl et al. . |
| 4,283,709 | 1/1980 | Lucero et al. . |
| 4,300,040 | 11/1981 | Gould et al. . |
| 4,314,334 | 3/1982 | Daughton et al. . |
| 4,358,756 | 1/1982 | Morel et al. . |
| 4,369,442 | 8/1983 | Werth et al. . |
| 4,455,453 | 12/1983 | Parasekvakos et al. . |
| 4,456,790 | 2/1984 | Soyack . |
| 4,477,901 | 10/1984 | Braband . |
| 4,496,237 | 1/1985 | Schron . |
| 4,497,037 | 1/1985 | Kato et al. . |
| 4,501,485 | 4/1985 | Tsudaka . |
| 4,506,974 | 3/1985 | Sugiura et al. . |
| 4,509,851 | 3/1985 | Ippolito et al. . |
| 4,510,491 | 4/1985 | Prato . |
| 4,523,299 | 9/1985 | Donohue et al. . |
| 4,549,044 | 10/1985 | Durham . |
| 4,574,283 | 3/1986 | Arakawa . |
| 4,578,538 | 5/1986 | Pascucci et al. . |
| 4,583,834 | 6/1986 | Seko et al. . |
| 4,595,921 | 8/1986 | Wang et al. . |
| 4,611,205 | 10/1986 | Eglise . |
| 4,630,042 | 11/1986 | Kawasaki et al. . |
| 4,634,258 | 12/1986 | Tanaka et al. . |
| 4,654,800 | 2/1987 | Hayashi et al. . |
| 4,658,243 | 4/1987 | Kimura et al. . |
| 4,708,469 | 8/1987 | Bober et al. . |
| 4,709,149 | 8/1987 | Takahashi et al. . |
| 4,723,212 | 2/1988 | Mindrum et al. . |
| 4,752,950 | 7/1988 | LeCarpentier . |
| 4,766,548 | 7/1988 | Cedrone et al. . |

FOREIGN PATENT DOCUMENTS

| | | |
|---|---|---|
| 0121332 | 10/1984 | European Pat. Off. . |
| 27161 | 3/1981 | Japan . |
| 81656 | 5/1984 | Japan . |
| 59-91456 | 5/1984 | Japan . |
| 116761 | 7/1984 | Japan . |
| 101664 | 7/1985 | Japan . |
| 230167 | 11/1985 | Japan . |

Primary Examiner—R. L. Moses
Attorney, Agent, or Firm—Blum Kaplan

[57] ABSTRACT

A system for monitoring a variable output paper processing device is provided. The monitoring system includes a counter which counts the number of papers processed and provides a count signal for each counted paper. A controller receives the count signals and totals the counts. The controller transmits the total count to a central station through a modem after either a predetermined time or a predetermined count. Internal diagnostic signals in the printing device are intercepted as they are transmitted to an internal display device of the printing device and transmitted to the central computer through the modem.

49 Claims, 7 Drawing Sheets

PHOTOCOPY MONITORING SYSTEM

CROSS REFERENCE TO OTHER APPLICATIONS

This is a continuation-in-part application of U.S. application No. 07/194,710 filed on May 17, 1988 now abandoned.

BACKGROUND OF THE INVENTION

This invention relates to a system for monitoring one or more paper processors, and in particular to a method and apparatus for monitoring photocopiers and signaling to the appropriate party information regarding the number of copies made during a predetermined time interval; when a predetermined number of copies have been made; when service is necessary; and calendar events such as when rental agreements or service contracts have expired.

According to the present system, photocopying machines when rented are billed at a per copy rate. This requires that someone at a central billing center must contact each copier user to ascertain the number of copies made over a predetermined time interval. A copier user at the copier site then travels from machine to machine reading the number of copies made over a predetermined period from a copy count meter on each machine. These manually read numbers are then manually transmitted by telephone or postcard to the billing center where the bill for each machine is calculated in accordance with the number of pages reported by the on site meter reader. Additionally, meter readings are used to monitor service contracts and preventive maintenance schedules.

This prior art billing system has not been satisfactory. The manual reading suffers from the disadvantage that often the people who are responsible for reading the meters are too busy to read the meters at the predetermined times. Furthermore, they may improperly read the meter or read correct data and transmit error filled data causing the issuance of incorrect bills requiring further manual labor to recheck the meter as well as correct the bills. This results in a loss of time and money for both the customer and the billing center.

Machine service is also requested manually by the copier user, requiring notification to the service center as to when the machine is down or when preventive maintenance is required. A user must first become aware of the problem and then the user must manually notify the service area of the need for repair or preventive maintenance. This system has also not been satisfactory. Often, users are not aware that a machine is down and/or will often not report a down machine until all of the machines in an office or area are down creating a backlog in the office. Furthermore, when reporting that the machine is down, the reporting person, not having technical expertise, will not be able to correctly diagnose the problem. This may result in the repairman arriving with the improper materials and tools, thus increasing the repair time and down time. This lack of technical expertise also results in service personnel being dispatched on repairs which may be cured by telephone instructions to the copier operator, thus increasing overall repair costs. Additionally, copier operators are often unaware of when preventive maintenance is required in that they are not familiar with the preventive maintenance schedules. Even if aware, they often times will not monitor the machines and notify the service center when the appropriate preventive maintenance is required. Since there is no way of ensuring notice to the central billing and/or service center of a machine reaching a scheduled preventive maintenance usage level or the end of service contract, appropriate responses to these events cannot be undertaken in a consistently timely manner.

A system for automatically monitoring a copier is known in the art from U.S. Pat. No. 4,583,834. This device monitors a number of copying machines utilizing a number of sensors placed on the copier for sensing various operating parameters such as the number of copies made by the machine, machine malfunctions and the amount of toner remaining in the machine. Signals representing these parameters are transmitted to a centralized processor. The count value is transferred to the central processor at predetermined intervals. One of the disadvantages of this system is that it requires a dedicated interface having a complex structure receiving input signals from a plurality of distinct sensors provided within each machine. It also fails to notify a user of specific information such as preventive maintenance and contract termination dates. This system is not suitable for installation in existing machines not expressly designed for the system.

A second photocopier system is known from U.S. Pat. No. 4,497,037 and includes a plurality of terminal devices provided at each copying machine and a central managing unit for managing the terminal devices. Each of the terminal devices receives input signals indicative of a plurality of user identifications of the copying machine and a second input signal indicative of utilization associated with each user at each copying machine. These data signals are stored and later transmitted to a central managing unit. The terminal receives a signal from the copying machine to which it is connected representing the number of copies made by the copying machine and which user made the copies. This information is transmitted to a central unit at a later date. One of the disadvantages of this system is that it does not monitor operating malfunctions of the copier or notify a service center when preventive maintenance is required.

Accordingly, it is desirable to provide a system for monitoring a copying machine which overcomes the shortcomings of the prior art systems described above.

SUMMARY OF THE INVENTION

Generally speaking, in accordance with the invention, a system for monitoring a printing or paper processing device, such as a photocopier, and automatically notifying the appropriate off site parties at appropriate times of the status of the photocopier as well as the status of the service contract and preventive maintenance needs is provided. A counter counts the number of papers processed by the copier producing a count signal. A monitoring system computer receives the count signal and increments a count value over a predetermined period. An interface circuit monitors the operation of the copier by monitoring the internal diagnostic signals of the copier as displayed on a photocopier display device associated with each copier and signals a central station when a malfunction of the copier has occurred, indicating the nature of the problem by translating the diagnostic signal and transmitting a translated diagnostic signal. The monitoring system computer also transmits both an accumulative count once the predetermined time period has elapsed or once a predetermined number of counts has occurred indicating the number of papers which have been processed. A modem receives the accumulative count and diagnostic signals from the monitoring system computer and transmits each signal to the appropriate party at the central station.

A portable input/output circuit is provided so that servicemen may interface with the system at the repair site. The input allows the servicemen to key into the system the time of repair and type of repair, including parts used or needed, while the output system allows them to receive messages from a dispatcher transmitted through the photocopy monitoring system. The service person may also receive the diagnostic information generated by the photocopying system.

A plurality of copiers at a single site may be provided with a local area network. A master controller containing a single modem is attached to a single telephone line. The controller polls the monitoring system computer at each copier through the local area network to ascertain the number of copies made and the maintenance status of each copier. At a predetermined time or upon predetermined events such as a maintenance requirement at a particular copier, the controller transmits a single report for each of the copiers through the modem to a central station.

A billing computer is provided at the central station and is linked by modem to a plurality of copier monitoring systems. Each photocopier monitoring system sends billing data to the billing computer which is off site at the central station at a predetermined time for processing. The billing computer will contact each non-reporting copier monitoring system if it has not received a billing signal at the predetermined time ascertaining the status of each copier.

Accordingly, it is an object of this invention to provide an improved system and method for monitoring photocopiers.

Another object of this invention is to provide a system for automatically notifying a billing center of copier usage when a predetermined billing period has elapsed.

A further object of this invention is to provide a system which automatically notifies a service center when preventive maintenance is required.

Yet another object of this invention is to provide a system for monitoring a photocopier which automatically notifies a service center upon the need of servicing.

Still another object of this invention is to provide a system for monitoring a photocopier which eliminates human error.

Yet another object of this invention is to provide a monitoring system which reduces photocopier down time.

Still a further object of this invention is to provide a system for monitoring a photocopying system which eliminates incorrect and late billing.

A further object of this invention is to provide a system for monitoring a copier and notifying the appropriate party as need arises on a twenty-four hour basis.

Yet another object of the this invention is to provide a system for automatically notifying a central service center when a service contract has expired.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which.

DETAILED DESCRIPTION OF THE PREFERRED EMBODIMENTS

Generally, paper printing and processing devices, and in particular photocopiers, contain a display device, usually a liquid crystal, LED or other alpha-numeric display, for visually displaying to the user the status of the devices. The internally generated signals which drive the display device include diagnostic signals which cause the photocopier display to display malfunctions within the photocopier or report maintenance requirements such as toner and paper refill. A paper count signal drives the display device, in this case usually an internal, readable counter to display a total paper count value corresponding to the number of sheets of paper processed by the photocopier. A photocopier monitoring system constructed in accordance with the invention monitors the diagnostic signals and upon detection of a diagnostic signal, translates the diagnostic signal into a signal usable by an off site end user to determine the condition of the photocopiers. This translated signal is automatically forwarded to the end user upon detection. The last such signal is stored for use by the service personnel or in case of disruption in transmission facilities. Additionally, the photocopier monitoring system constructed in accordance with the invention monitors the count signal to determine a total count value based upon the number of counts detected during a predetermined interval and automatically notifies an off site end user when a predetermined number of counts has occurred or what number of counts has occurred in a predetermined real time interval. The predetermined interval and count number correspond to billing cycles, preventive maintenance intervals and contract termination intervals, allowing appropriate personnel located at a central station off site from the photocopier being monitored to automatically provide the appropriate service requirement and maintain accurate billing records. The monitoring system may either be attached to an existing copier or constructed within the copier at the time of manufacture.

Figure 1:
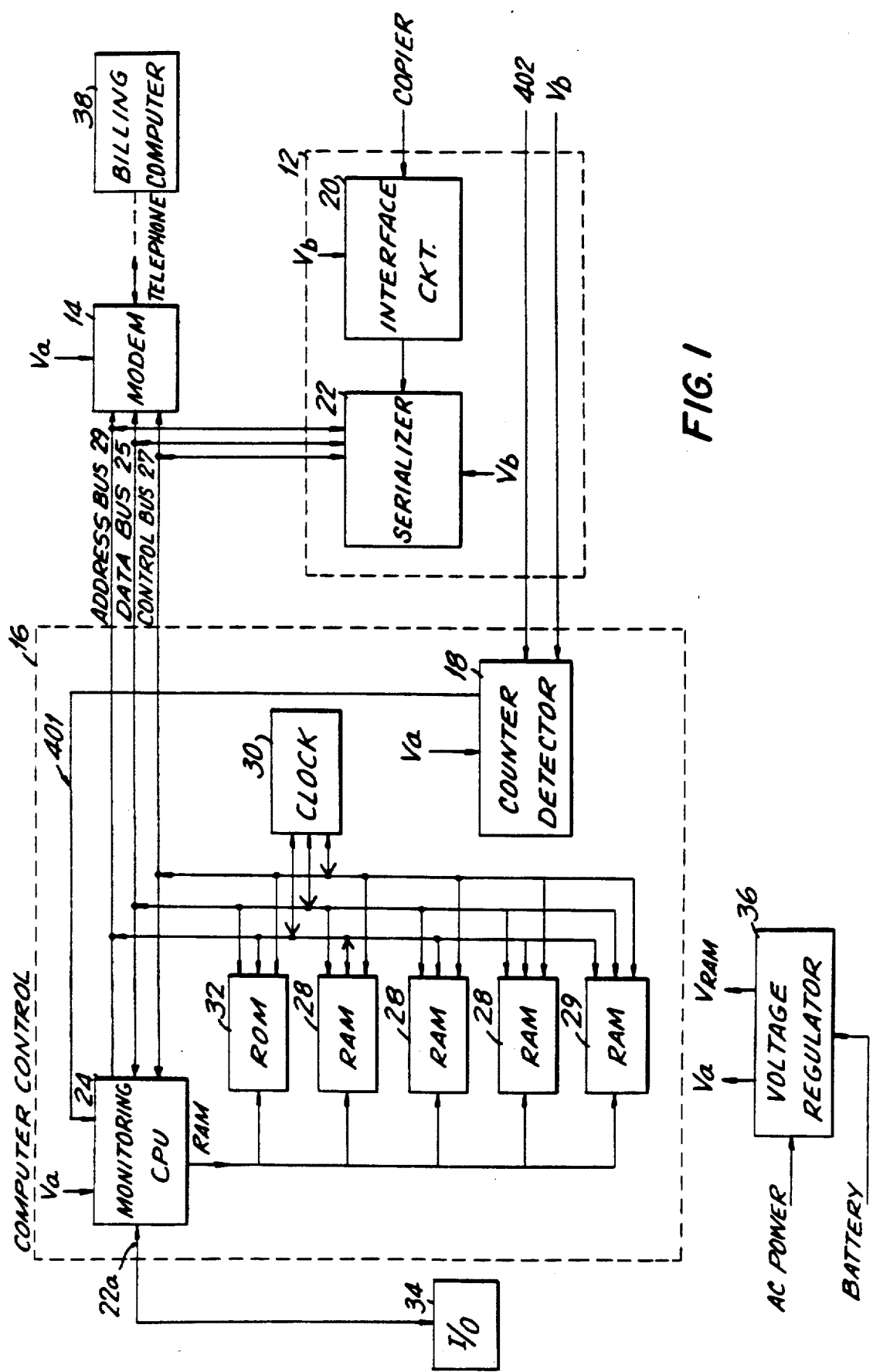
FIG. 1 is a block diagram of a system for monitoring a photocopier constructed in accordance with the invention.

Reference is made to FIG. 1 wherein a first specific photocopying monitoring system, generally indicated as 10, constructed in accordance with the invention, is depicted. The system includes an interface 12, a modem 14 and a computer control 16. Interface 12 receives signals from a copier (not shown) and transmits those signals to computer control 16. Computer control 16 causes modem 14 to transmit certain signals to an appropriate party, for example to a billing computer 38.

Modem 14 may be a 300/9600 BAUD modem and is utilized for data transfer and call progress detection.

Figure 7:
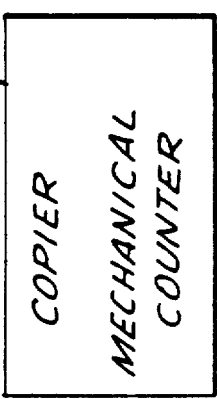
FIG. 7 is a circuit diagram of a meter counter monitor constructed in accordance with the invention.

Each paper processing device has an internal paper counter, this counter counts paper and produces an internal count signal 402 which increments the counter. The count signal 402 is input to monitoring CPU 24. The count detector 18 receives a count signal 402 each time a piece of paper has been processed by the paper processing device. Count detector 18 then sends an interrupt signal 401 to monitoring CPU 24 to count a piece of paper in RAM 28. One example of a count detector 18, shown in FIG. 7, is an optocoupler version of a counter detector 18.

Many photocopying machines, such as model EP470Z manufactured by Minolta Camera Co., Ltd. have an internal mechanical counter 12, with two input terminals for connection to the internal circuitry of the photocopying machine. Accordingly, one of the two terminals of the copier internal counter which receives the paper count signal 402, is coupled to one of the terminals of a terminal block 404. An LED 406 is connected through diode 410 to that terminal of block 404. The anode of LED 406 is connected in series with a copier voltage source Vb and a resistor 408. The emitter collector path of light detecting transistor 41 is coupled between ground and a series connected resistor 416 and a voltage source Va. The output of the light detecting transistor 412 taken between resistor 416 and transistor 412 applies an interrupt control signal 401 to monitoring CPU 24. A typical optocoupler comprising LED 406 and phototransistor 412 suitable for use is part no. 4n27 manufactured by Motorola.

In the embodiment described above, internal mechanical counter 12 is coupled to a twenty four volt power supply and thus provides a twenty four volt count signal 402. When a piece of paper is processed by the paper processing device, a count signal 402 on terminal 404 drops to substantially zero providing a interrupt signal. When the voltage of the paper counter signal 402 is substantially zero, LED 406 and diode 410 are forward biased forming a current path between a five volt source generated by the copier Vb, and terminal 404 having count signal 402 as its input, thus lighting LED 406. The current flows for the duration of the paper count signal 402. Light detecting transistor 412 detects the light emitted by LED 406 and turns on, pulling the interrupt signal 401 low to monitoring CPU 24, indicating that a piece of paper has been processed, and monitoring CPU 24 operates on the interrupt signal 401 to begin a count sequence. Preferably, monitoring CPU 24 only operates on the falling edge of interrupt signal 401.

When the paper processing device is off, LED 406 does not become lit because both the copier counter voltage Vc of twenty four volts and Vb of five volts go low while the interrupt signal on line 401 is maintained at a high logic level by a backup battery supply. Therefore, paper counter signal 402 prevents a path to ground when no power is applied to the paper counting device. Additionally, copier counter 402 does not damage LED 406 when high (at 24 volt signal) due to diode 410 which blocks current flow from copier counter 421. As described above, an optocoupler may be used as count detector 18. However, it is envisioned that count detector 18 may be a light beam trigger as discussed, a magnetic pickup or the like.

Computer control 16 includes a monitoring central processing unit ("CPU") 24 which receives the count signal produced by counter 18 along a data bus 25. Monitoring CPU 24 counts the number of count signals detected by storing a total count value in a random access memory ("RAM") 28 which is incremented each time a count signal is received. In an exemplary embodiment three RAMs 28 are provided. Monitoring CPU 24 controls where the respective total count values have been stored by assigning an address to each total count value. Monitoring CPU 24 may be a Hitachi 6305 microprocessor.

A real time clock 30 sends a signal at predetermined intervals to monitoring CPU 24. Monitoring CPU 24 at these predetermined intervals then sends a control signal along a control bus 27 to retrieve the count information stored in RAMs 28. The data stored in RAMs 28 is transmitted along the data bus. Information concerning the location of stored data is transmitted along address bus 23. Monitoring CPU 24 transmits the data along the data bus 25 to modem 14 which may be part of a local area network or coupled to a telephone line. Monitoring CPU 24 signals modem 14 along control bus 27 to transmit the count information to the appropriate central station billing computer 38.

By providing a count detector 18 which counts the number of pages processed and transmits that count to computer control 16 which stores that information until a predetermined time and then transmits that information to a billing center at predetermined intervals, an automatic billing system is provided. For example, clock 30 may be set for monthly intervals, thereby monitoring CPU 24 transmits through modem 14 to a billing center the number of copies made each month. The time at which each monitoring system reports to the central station is staggered so that not all copier monitoring systems report at once preventing a report traffic jam at the central station billing computer. The billing computer then automatically receives the necessary information to produce bills at a predetermined time interval, minimizing the need for human intervention.

Billing computer 38 is provided with a customer identification data base in which is stored identification data for identifying each copier, such as copier serial number, copier model the telephone number at which the copier is located and the last reported meter count of the copier.

When transmitting the count data to the billing computer, photocopier monitoring system 10 will identify itself with the identifying code as described below in connection with FIG. 4. A modem located at the central station billing computer answers the phone and receives the count data from modem 14 of photocopier monitoring system 10. The billing computer compares the incoming identification number with an identification number stored within the billing computer data base to verify that the incoming call is in fact a valid call from a legitimate photocopier monitoring system. Each incoming call is then recorded in a transaction log file of the billing computer data base. The monthly meter count that is stored in the transaction log data base is then utilized to update the meter count information as stored in the customer identification data base. This data base may now be used to prepare a billing report for each customer. This may be done manually by reentering the updated identification data base into an already existing billing system or by directly inputting this information into a billing software program for automatically generating a billing report upon the input of the updated count.

Furthermore, each copier uses a portion of consumable goods, such as but not limited to toner, developer and paper, when producing copies. By knowing the number of copies made as reported by the monitoring system how much of each consumable good is used per copy, a monthly total of consumed goods may be calculated. This allows the central station to maintain consumable good inventories for each copier. The central station would then arrange for quick replenishing of low consumable good inventories, reducing copier down time and protecting good copy quality.

As will be discussed below, the photocopier monitoring system also provides photocopier diagnostic information, preventive maintenance information and end of service contract information. When this information is transmitted to the billing computer, the billing computer again validates the incoming message and records the incoming message in a transaction log file. The contents of this file are then applied to update the customer identification file. Simultaneously, the billing computer operator is notified that an incoming diagnostic message or other message requiring action has arrived. The operator may be notified by a display indicator on the monitor screen associated with the billing computer 38 to either indicate that a report is on hand and may be read or the actual report itself will be displayed on the screen. The billing computer operator may then ask for a hard copy of the report and respond to the message as appropriate. Similarly, the operator would be notified when preventive maintenance is required or when a calendar event such as service contract termination occurs. While only a single billing computer 38 is depicted, separate service and billing computers at different telephone numbers can be provided to perform separate functions.

The billing center may also send a signal to monitoring system 10 to retrieve the paper count information. Billing computer 38 also contains an internal real time clock (not shown) which indicates after a predetermined time period that a signal should be incoming from photocopier monitoring system 10. If after a predetermined time interval no signal has occurred, billing computer 38 through modem 14 will poll photocopier monitoring system 10 to ascertain the status of the copier being monitored by photocopier monitoring system 10 and retrieve the information stored in RAM 28.

Flags equivalent to a predetermined count value and a predetermined time period are stored in RAMs 28 to indicate the appropriate time interval for reporting to the central billing center. Computer control 16 contains a ROM 32 which contains a program for allowing monitoring CPU 24 to determine when the time generated by real time clock 30 equals the predetermined time period stored in a designated RAM 28. When the two time periods match, monitoring system CPU 24 sends a signal through modem 14 to billing computer 38 indicating that the predetermined time period has ended and forwards the total count value to the billing computer. By providing a flag contained within the memory of computer control 16, the copier monitoring system provides automatic periodic billing. Accordingly, billing occurs at the appropriate time.

To indicate the appropriate intervals at which preventive maintenance should occur, ROM 32 contains a program for allowing monitoring CPU 24 to determine when the count value generated by monitoring CPU 24 equals the predetermined count value stored in a RAM 28. ROM 32 acts as a secondary clock allowing monitoring CPU 24 to identify when a predetermined count number has been reached. When ROM 32 has been triggered monitoring CPU 24 sends a signal through modem 14 indicating that the predetermined number has been reached. By providing a flag contained within the memory of computer control 16, the copier monitoring system provides an automatic preventive maintenance signal to a service center. Accordingly preventive maintenance can occur at the appropriate time after the count detector has detected a predetermined number or pages.

The photocopier (not shown) produces internal signals for producing an output on a visual display device or like display including a diagnostic signal for signaling to the user of the copier when a system failure, such as a paper jam or a part malfunction has occurred. Each different copier model produces different formats of diagnostic signals. This signal is provided along a cable between a copier's internal CPU for generating the diagnostic signal and the copier's display device for users. Interface circuit 20 intercepts these diagnostic signals from the copier and acts on them to place them in a form readable and useable by the billing computer at the central station.

In photocopier monitoring system 10, interface circuit 20 remains passive to the copier and is programmed to detect the particular diagnostic signals of each model copier and translates these signals into predetermined codes for transmission to the central station billing or other computer. Interface circuit 20 receives each diagnostic signal and translates the copier specific diagnostic signal into an output signal which may be understood by a billing or other computer located at a central station. When necessary the diagnostic signal is formatted by interface circuit 20 by adjusting the signal voltage to place it in a condition useable by computer control 16 and modem 14. As will be described below in connection with a preferred embodiment, the interface is interchangeable and taps into the diagnostic signal transmitting cable of the copier without interfering with the operation of the copier or requiring multiple connections to various portions of the copier.

To reduce the number of wires necessary to transmit the translated signal to computer control 16, the incoming diagnostic signal, after being translated by interface circuit 20, may also be serialized by a serializer 22 when necessary.

In an exemplary embodiment serializer 22 is a dual asynchronous receiver/transmitter device which provides two channel asynchronous serial communication for interfacing with computer control 16 and modem 14. Serializer 22 transmits the serialized signal to computer control 16. Serializer 22 is preferably used when the output of the copier to interface 20 is in a parallel formation. Generally, a serializer is not necessary when the copier signals transmitted by interface circuit 20 are in parallel and computer control 16 is adapted to accept data in a parallel format or the diagnostic signal internally generated by the copier is a serial signal.

The formatted output signal is transmitted to serializer 22 which serializes the output signal. The serialized signal is transmitted to monitoring CPU 24 which translates the signal and which signals modem 14 to begin sending the serialized formatted translated signal to a service center. The diagnostic data of the photocopier may be stored, if required, in RAM 29, which can also store maintenance information, such as data related to recent service and data as to when certain copier parts were replaced. Such information can be input and retrieved by the service person using a portable input/output device 34 more particularly described below. This information is particularly useful where communication with the central station is disrupted.

Additionally, the maintenance status of the copier may be ascertained by the billing or other computer located at the central station. The billing or other computer sends a status inquiry signal to monitoring CPU 24 causing controller 16 to output the information stored in RAM 29.

At the central station, the signal is received indicating to the central station the nature of the copier trouble. By providing an interface 12 which intercepts and interprets internal diagnostic signals of a copier and signals a computer control circuit to signal a central station, automatic reporting and diagnosing of the copier is accomplished, thus minimizing human error, human intervention and the guess work of copier repair. Upon receipt of the diagnostic signal the central station then dispatches a service person and informs the service person of the nature of the problem and the requisite tools and parts.

Each service person may be equipped with a portable hand held input/output device 34 in the form of a keypad/display which may become part of the system through an auxiliary input 22a of monitoring CPU 24. In another embodiment it may be input through an auxiliary input external to interface 12. Input/output device 34 may also include internal memory (not shown). This allows the service person to read out the diagnostic information from the system. The service person at the job site may also communicate with the central station through modem 14 by becoming part of system 10, through input/output device 34. The service person at each job would input his time of arrival at the job site, the work completed, parts replaced and needed, and then the time of the completion of the job. By providing such an input/output system, the copy monitoring system may maintain service inventory as well as service billing on a real time basis, while providing a method for keeping track of employees. Furthermore, the dispatcher at the central station can transmit data for the service person by storing retrievable information in RAM 29. The service person may then connect his input/output device 34 and retrieve the information stored in RAM 29 so that the central station may communicate with each service person directly through photocopier monitoring system 10 saving the time necessary for the service person to call into the central station for further instructions. The message would be printed out on a display (not shown) of input/output device 34. The display of input/output device 34 may comprise an LED or LCD display.

A voltage regulator 36 is provided to maintain a constant voltage source during power outages. Voltage regulator 36 receives AC or DC power, preferably from the copier itself, and transmits a Va voltage to the various circuits and a voltage VRAM to the memory. When voltage regulator 36 detects a failure in power from the AC power source, voltage regulator 36 switches to an alternate battery power source. In a preferred embodiment the battery may be a lithium or rechargeable battery.

Figure 2:
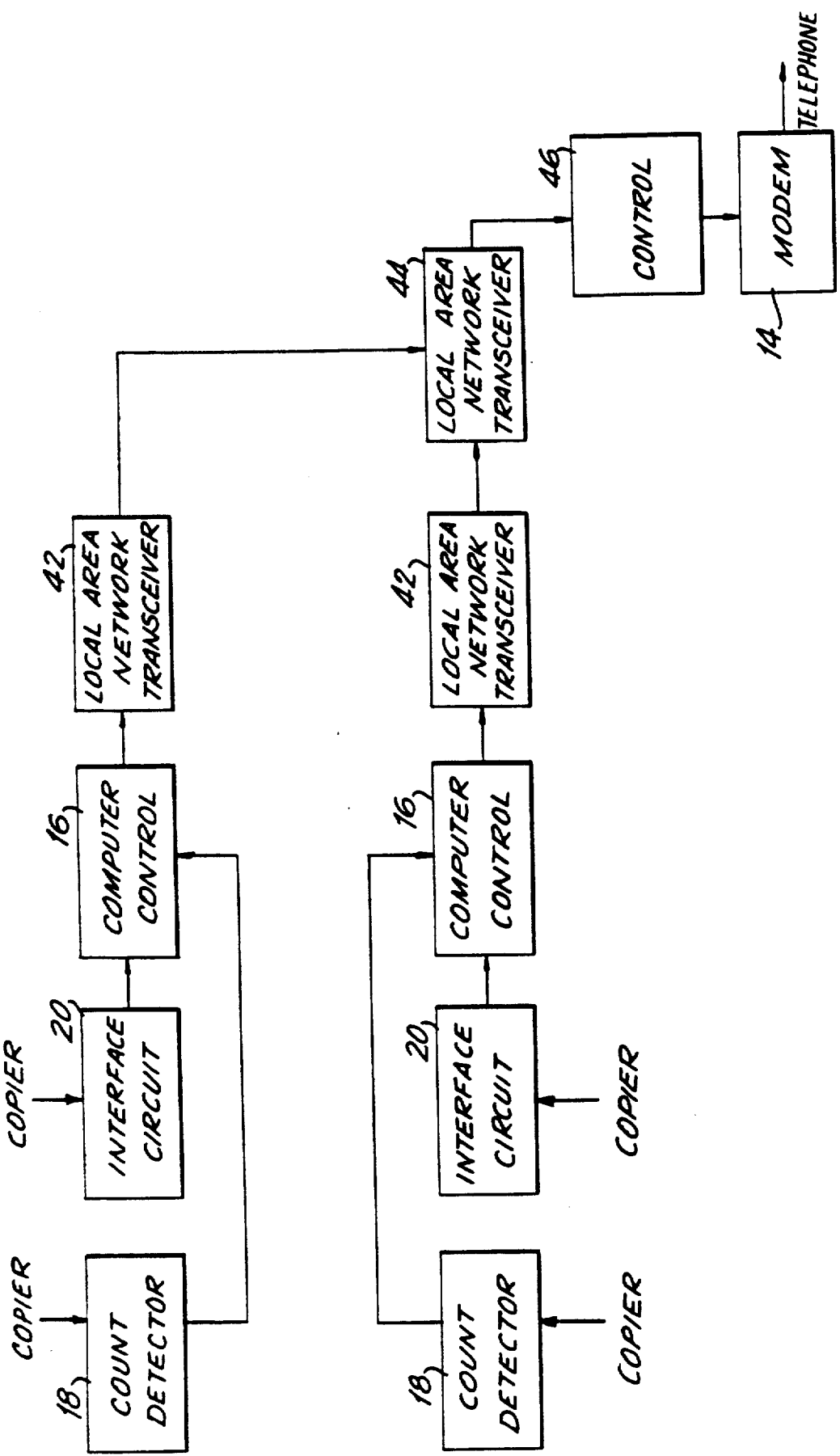
FIG. 2 is a block diagram of an alternative embodiment of the invention.

Reference is now made to FIG. 2 wherein an alternative embodiment for the photocopier monitoring system, generally indicated as 40, for monitoring a plurality of copiers is provided. Monitoring system 40 also includes count detector 18 for each copier. Each count detector 18 inputs a count signal to respective computer controls 16. An interface circuit 20 also monitors the copier diagnostic signals from each respective copier. Interface circuit 20 transmits the diagnostic signal to respective computer controls 16. Counters 18, interface circuits 20, and computer controls 16 behave in a manner identical to that in system 10.

In this embodiment each computer control 1 transmits its signals through an on-site local area network transceiver 42. Generally, control 46 polls each copier station at predetermined intervals and stores information received from each local computer control 16 and transmits that information at a predetermined time through modem 14 to the billing center. Each local area network transceiver 42 transmits a signal to a local area network transceiver 44 at a site removed from the copier. Local area network transceiver 44 then transmits the signal to central computer control 46 which operates on the information in an identical manner as local computer control 16 of system 10. Each local computer control 16 also stores malfunction occurrence information which is not transmitted until polled by control 46. However, if there is a paper jam malfunction detection which exists for more than a preprogrammed time, such as forty-five minutes, local computer control 16 will detect this condition using its internal clock and will notify control 46 to notify the central station. The polling period is fairly short, to allow prompt service reporting. In an exemplary embodiment the period is several minutes.

Computer control 46 transmits its signals through modem 14 to a billing or other computer at a central station along the telephone lines. Local area network transceivers 42, 44 may be a carrier current modem utilizing the power lines contained within an office space, a high frequency transmitter and receiver or a telephone and modem located at both the copier station and the computer control circuit 16 station. By providing a local area network between the computer control circuit and the copier, it becomes possible to monitor a plurality of copiers while tying up only a single external telephone line saving telephone time and telephone space. Although only two copiers are depicted in FIG. 2 by way of example, the system is applicable to any number of copiers.

Figure 3:
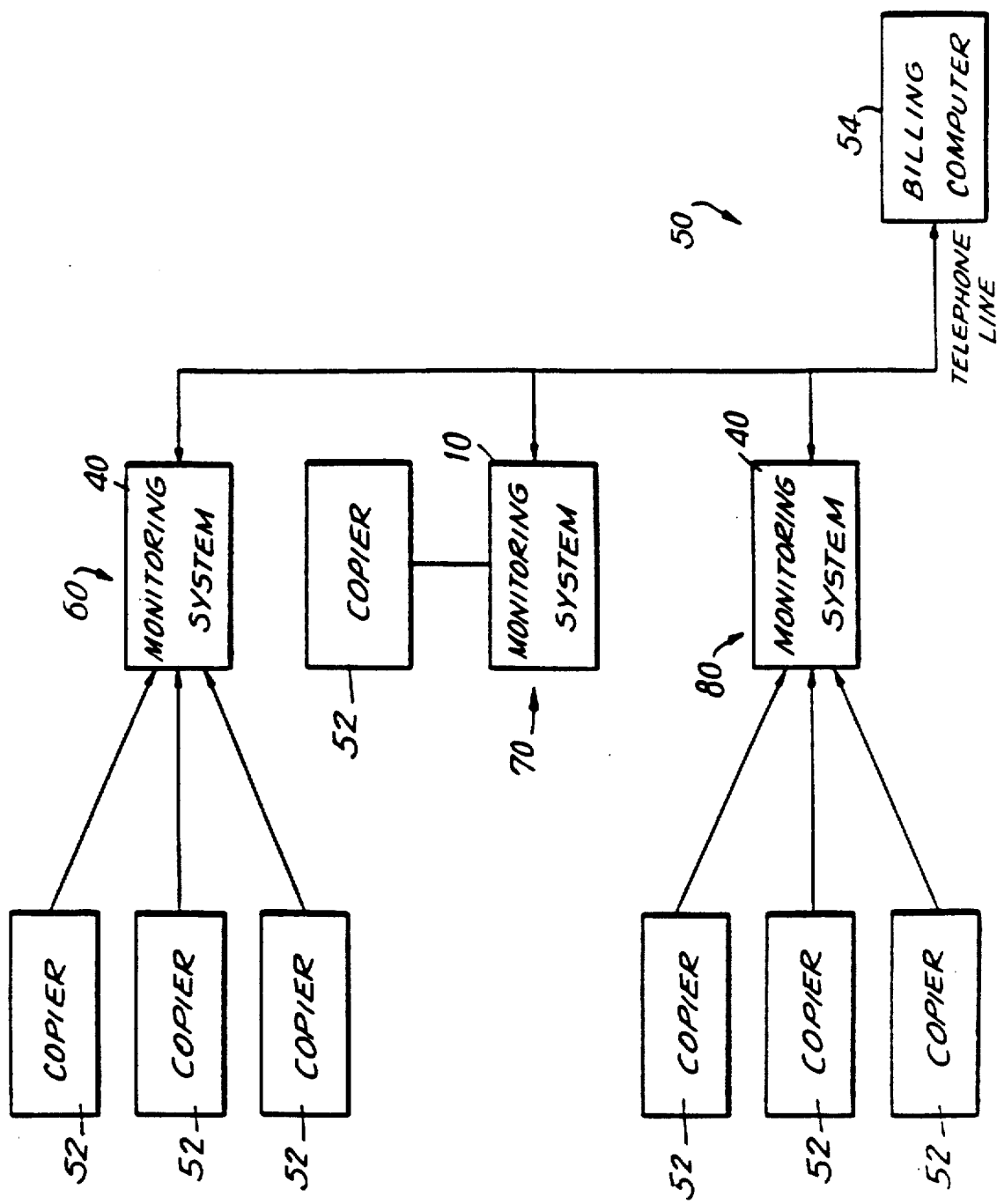
FIG. 3 is a block diagram of a billing network in accordance with the invention.

Reference is now made to FIG. 3 wherein a photocopying monitoring and billing system generally indicated as 50 constructed in accordance with the invention is depicted. A plurality or photocopier monitoring systems 60, 70, 80 are situated at separate sites such as individual offices or buildings. Monitoring system 60 includes a plurality of copiers 52 and a photocopier monitoring system 40 for connection with a billing or other computer 54 located at a central station. Similarly, system 70 comprising a single copier 52 and a monitoring system 10 is also connected to billing computer 54 through the telephone line as is system 80 having a monitoring system 40 for connecting a plurality of copiers 52.

In accordance with the invention each photocopier monitoring system 40 or photocopier monitoring system 10 signals billing computer 54 at predetermined intervals to transmit the number of copies processed by each copier 52 of respective copying systems 60, 70, 80. Upon receipt of this information billing computer 54 generates the bills for each customer corresponding to the information received from the respective photocopying systems as discussed above. Additionally, billing computer 54 stores the predetermined time interval for each monitoring system and if a signal is not received from the monitoring system at a predetermined time interval billing computer 54 will signal the non-reporting system and trigger the photocopier monitoring system to transmit the stored data associated with each copier. Accordingly, by providing a plurality of monitoring systems which automatically indicate to a billing computer the number of copies processed at predetermined intervals an automatic, accurate and timely billing system is provided.

Figure 4:
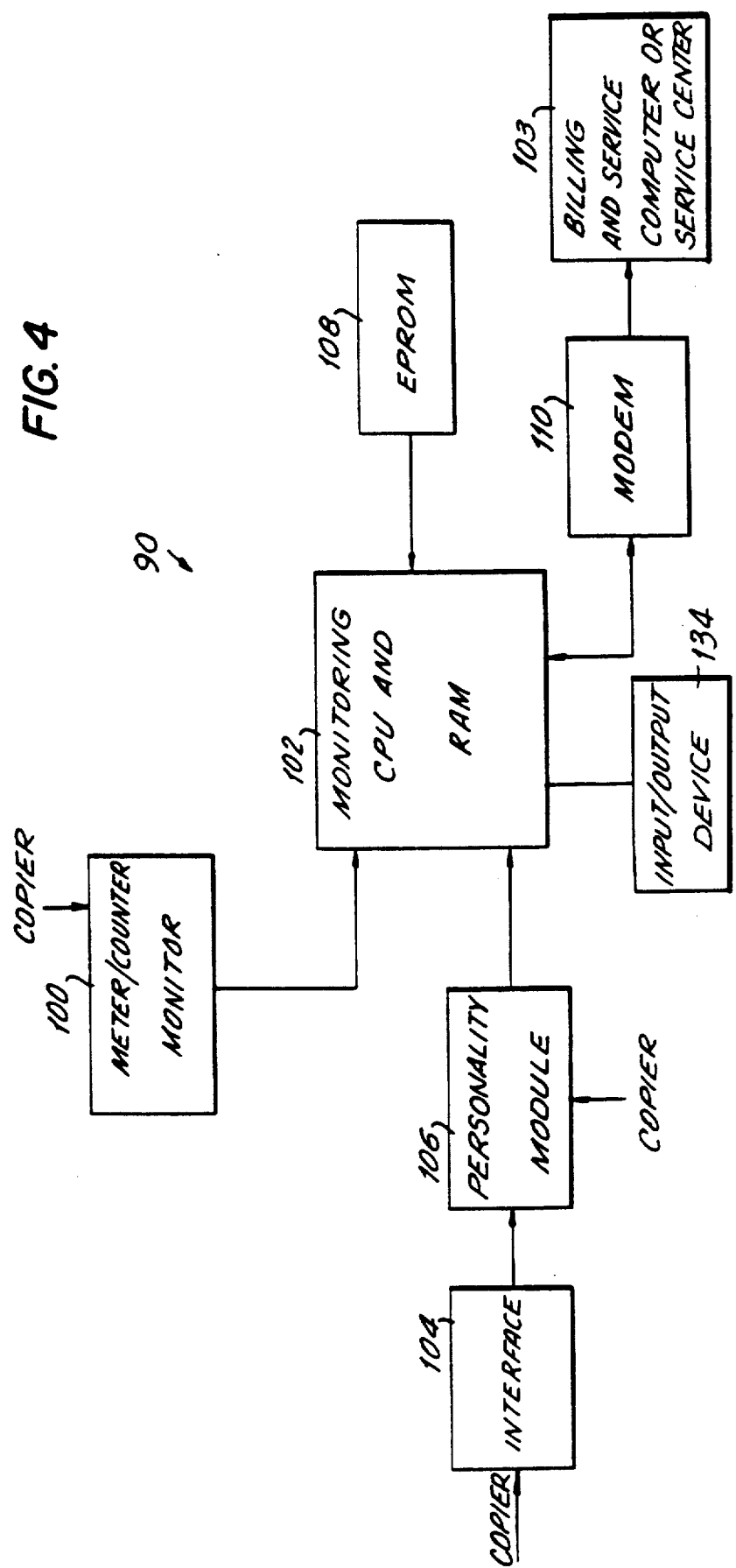
FIG. 4 is a block diagram of an alternative embodiment of photocopier monitoring system in accordance with the invention.

Reference is made to FIG. 4 in which an alternative embodiment of a photocopier monitoring system, generally indicated as 90, is provided. Photocopier monitoring system 90 operates in a substantially similar manner to photocopier monitoring system 10, but embodies an exemplary embodiment containing interchangeable programmable personality modules to allow greater flexibility in the application of the monitoring system.

A meter/counter monitor 100 is affixed to the copier and monitors the number of sheets processed in a manner identical to counter 18 above. Meter/counter monitor 100 is an optocoupler, magnetic detector or the like which provides an interrupt signal to a monitoring CPU 102 each time a piece of paper is processed.

Monitoring CPU and RAM 102 receives the interrupt signals from meter/counter monitor 100 and counts the interrupts received and increments by one a count value corresponding to the number of sheets processed. Monitoring CPU and RAM 102 includes an internal RAM for storing the count value. Monitoring CPU and RAM 102 assigns the count value an address within the RAM. Monitoring CPU and RAM 102 retains the address information for each respective count.

Monitoring CPU and RAM 102 contains flag information stored at other addresses within the internal RAM. The RAM may contain an identification number identifying the copier associated with each individual photocopier monitoring system. In an exemplary embodiment this is represented by a six digit code. The RAM also stores a service telephone number corresponding to the telephone number of a service computer and the telephone number of the billing computer or a single telephone number for both functions. A security code to block entrance to the photocopier monitoring system by non-authorized users is also stored within monitoring CPU and RAM 102. Monitoring CPU and RAM 102 also stores the last malfunction recorded as well as a time indicator such as time of day and date as to when that error had occurred. Information such as the last time the meter was read, last time a malfunction was recorded, the end of the service contract and the last time a preventive maintenance requirement was reported are also stored in monitoring CPU and RAM 102. Flags as to when monitoring CPU and RAM 102 should report to the billing or service computer are also stored in the RAM.

Monitoring CPU and RAM 102 also contains internal software for maintaining an internal real time clock which in connection with an EPROM as will be discussed below allows photocopier monitoring system 90 to send time cycle related reports to the billing or service computers. Additionally, monitoring CPU and RAM 102 includes preprogrammed software for controlling the modem allowing photocopier monitoring system 90 to make the necessary report to the billing or service computers.

A portable input/output device 134 carried by a serviceman may be coupled to monitoring CPU and RAM 102 to receive and input information to the system.

As discussed previously, each copier contains an internal copier CPU for generating the diagnostic and monitoring signals which are displayed on a visual display device. These signals are transmitted along a cable to drive the display device. In copiers such as the Minolta 470Z, this cable contains a female/male plug connection along the signal transmitting cable. An interface 104 is attached to the copier's signal transmitting cable at the female/male plug connection without interfering with the operation of the display device and monitors the diagnostic signals generated by the copier CPU. Interface 104 is physically placed to intercept the signals generated by the copier CPU. Interface 10 formats the signals when necessary by adjusting the voltage of the intercepted diagnostic signals as needed to make them compatible with monitoring CPU and RAM 102.

Figure 6:
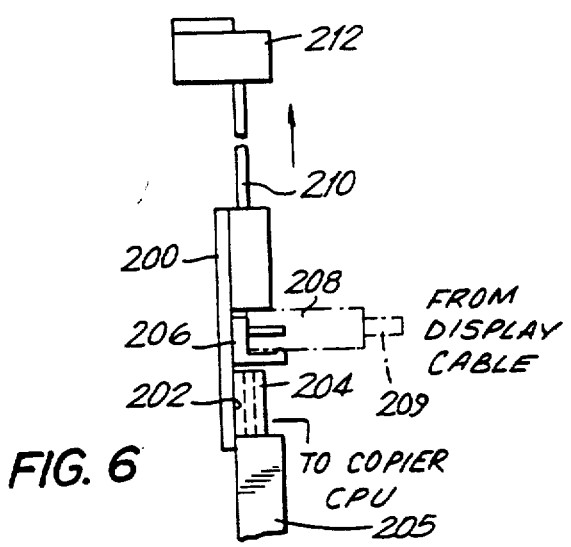
FIG. 6 is a side elevational view of an interface for connecting the photocopier to the photocopier monitoring system.

As seen in FIG. 6 interface 104 may include a mounting board 200. A cable 205 receives the diagnostic signals generated by a copier CPU for transmittal to the copier display device. A first connector 202 for receiving a cable connector 204 of cable 205 is mounted on board 200. A second connector 206 is mounted on board 200 and receives a connector 208 of display cable 209 and passes the signal received from cable 205 through board 200 to the copier display device. Accordingly, operation of the copier is not interfered with. A ribbon cable 210 which is electrically coupled to board 200 connects with a third connector 212 for connecting with photocopier monitoring system 90.

In one example, first connector 202 would be a female twelve pin connector to receive the male plug 204 of cable 205. Accordingly, connector 206 is a male connector for receiving female connector 208 of cable 209. Cable 210 is a ribbon cable which extends to a female plug 212. If the cable which transports information from the copier CPU to the copier display device does not have a male/female plug interconnect along the cable then interface 104 may be formed as an insulation displacement slice type connector for coupling the cable to interface 104.

A personality module 106 receives the input formatted diagnostic signal from interface 104 and transmits the internal diagnostic signals to monitoring CPU and RAM 102. Monitoring CPU and RAM 102 translates the signal into a form useable by a service computer 103 at the central station. Personality module 106 may also receive the internally generated paper processing count transmitted to the display by the copier as a comparison number for the count value delivered by meter/counter monitor 100. This paper count is also transmitted to monitoring CPU and RAM 102. Personality module 106 periodically monitors the copier through interface 104 at predetermined timing intervals so as to detect the presence of any internal diagnostic signals generated by the copier CPU. Upon the detection of a diagnostic signal, personality module 106 serializes the diagnostic signal and inputs the signal to monitoring CPU and RAM 102.

Each copier model and/or brand has a distinct internal diagnostic signal. Therefore, personality module 106 is interchangeable, allowing an appropriate interface to be applied to the corresponding copier. In an exemplary embodiment personality module 106 may include a personality CPU (not shown) for translating the signals input along copier signal cable 205 (FIG. 6). The personality CPU translates the incoming copier CPU generated diagnostic signal and transmits a translated signal along cable 210 to photocopying monitor system 90.

An interchangeable EPROM 108 provides software for controlling the function of monitoring CPU and RAM 102. Monitoring CPU and RAM 102 reads programs from EPROM 108. The software contained in EPROM 108 determines how the monitoring CPU and RAM 102 processes the data received and stored in RAM and the flags stored in RAM. EPROM 108 may also contain programs for controlling the processing of the output from meter/counter monitor 100. Monitoring CPU and RAM 102 searches its RAM in accordance with programs stored in EPROM 108 to determine when the monitor count stored in its RAM equals the flag number also stored at a different address in the RAM of monitoring CPU and RAM 102. Once monitoring CPU and RAM 102 determines that a predetermined number of monitor counts has been accumulated in the RAM, monitoring CPU and RAM 102 reports to the billing or service computer through a modem 110 in accordance with a program stored in EPROM 108. The basic EPROM 108 may be replaced with different EPROMs to provide different software control making photocopier monitoring system 90 more complex by allowing monitoring CPU and RAM 102 to perform a greater variety of functions.

Among the programmable functions that EPROM 108 would allow a CPU 102 to perform are device identification so that monitoring CPU and RAM 102 provides the identifying number stored in its RAM to the billing or service computer 103 at the central station through modem 110 to identify itself. EPROM 108 can cause monitoring CPU and RAM 102 to transfer the last abort data corresponding to the last malfunction report stored in its RAM to indicate when the last copier failure occurred by month, day, year, hour and minute, as represented by the real time clock operated by monitoring CPU and RAM 102 along with a failure code corresponding to the translated diagnostic information provided by interface 104. As discussed, EPROM 108 contains programs causing monitoring CPU and RAM 102 to compare a flag stored in its RAM to determine when a billing cycle or preventive maintenance cycle has been completed, causing monitoring CPU and RAM 102 to notify the appropriate billing or service computer 103. EPROM 108 also contains programs controlling the determination of whether or not the proper password has been provided to allow an outside user contacting monitoring CPU and RAM 102 through modem 110 to retrieve information from photocopier monitoring system 90. EPROM 108 also controls the dialing out to the business telephone number and service telephone number stored in RAM of monitoring CPU and RAM 102.

Because all of the data including the flag upon which the program of EPROM 108 operates are stored in RAM, photocopier monitoring system 90 may be reprogrammed from a remote location through modem 110. For example, the flag data, and telephone numbers may be changed as needed. A computer may send a signal through modem 110 to reset the flags the RAM or information such as a business telephone number or service telephone number, resulting in EPROM 108 causing different computers to be contacted at appropriate times and changing the billing cycle or the service cycle.

Figure 8A:
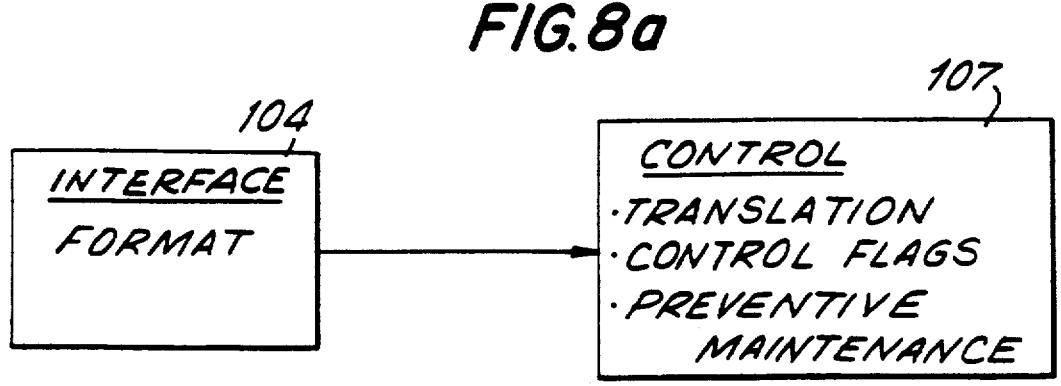
FIGS. 8a-8c are block diagrams of alternative embodiments of a system for monitoring a photocopier constructed in accordance with the invention.
Figure 8B:
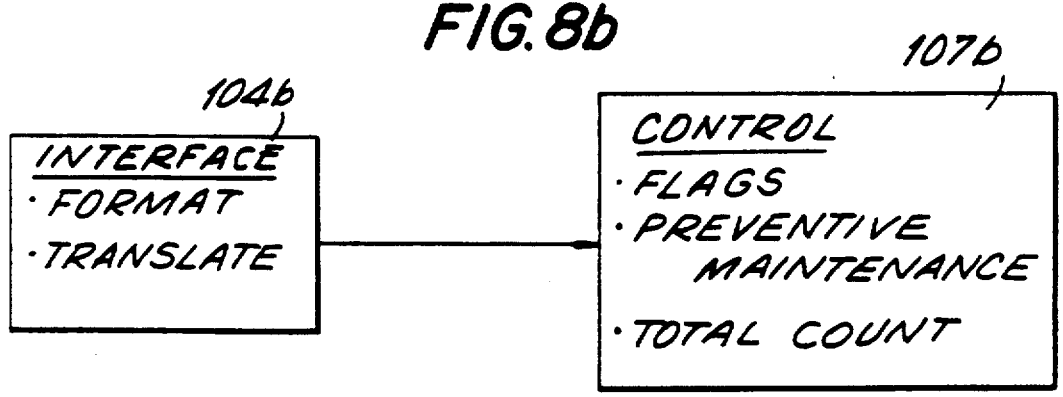
Figure 8C:
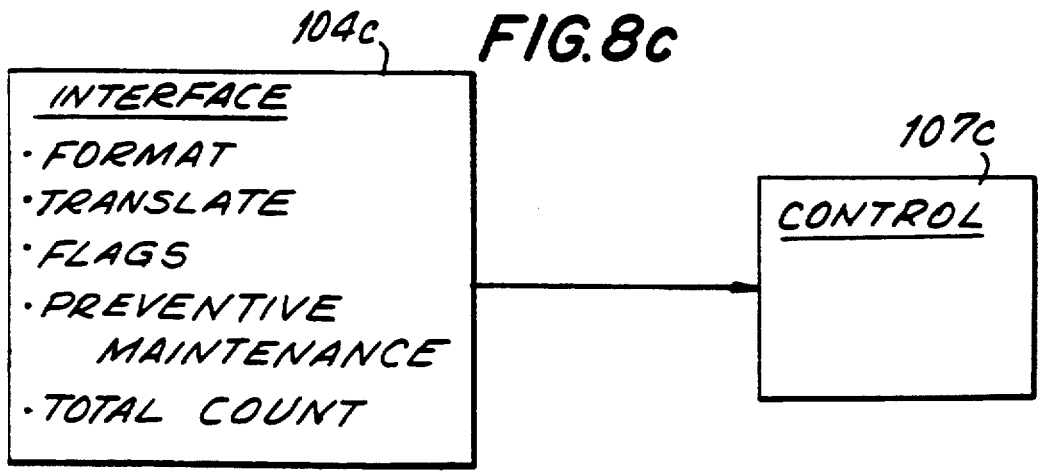
Figure 5:
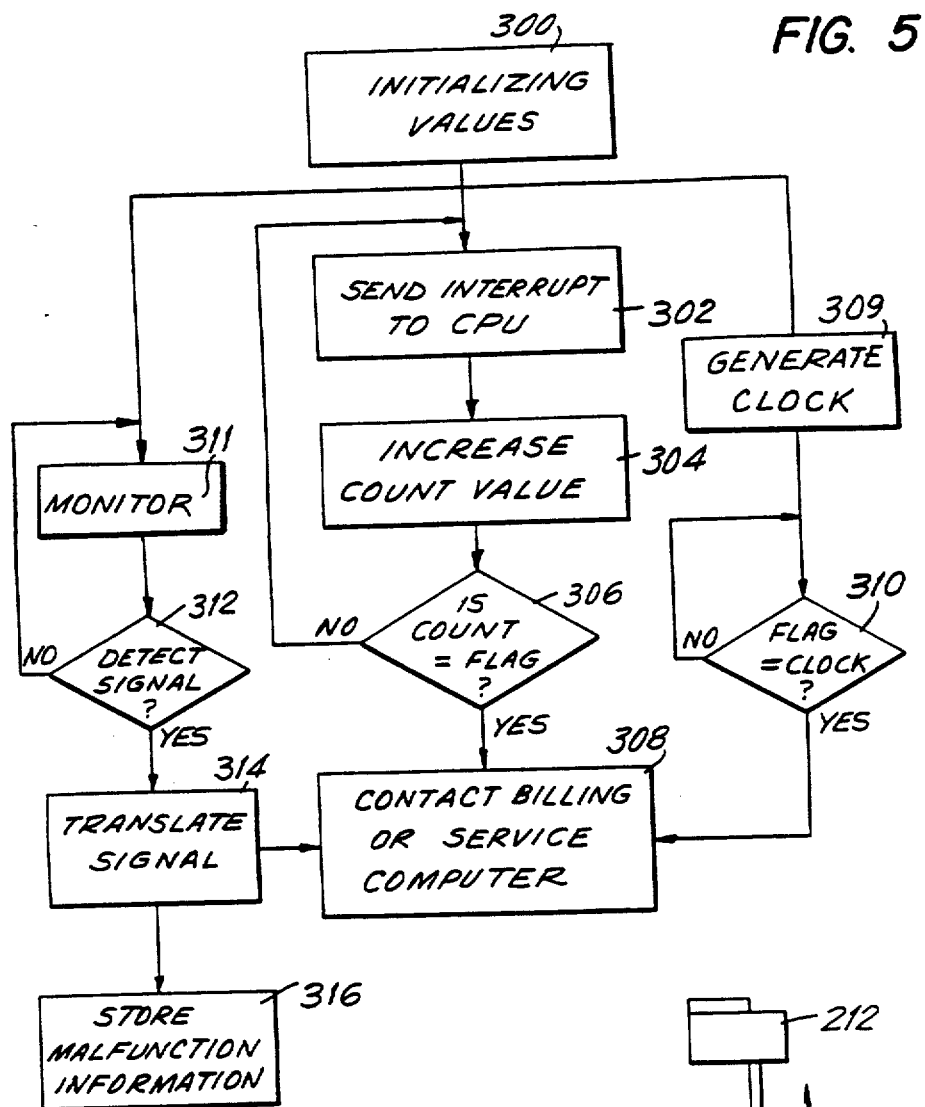

Reference is now made FIGS. 8a–8c, wherein a distribution of the functions of the monitoring system is provided. Generally the monitoring system has two components—an interface 104 and a control portion 107. In one of the examples of the invention described previously, a photocopier monitoring system includes a interface 104 which formatted the internal diagnostic signal and contained a personality module for translating the diagnostic signal. However, these functions as well as others performed by monitoring CPU and RAM 102 and personality module 106 in photocopier monitoring system 90 may be performed by structure found entirely in the interface or may be split between the monitoring system CPU and the interface, or may even in part be performed at the central station.

For example, as in FIG. 8a, an interface 104a merely formats the signal and transmits the formatted signal to a control portion 107a acting as an enhanced monitoring CPU personality module which performs the functions of both monitoring CPU and RAM 102 and personality module 106. Control portion 107a then translates the signal to a form useable by the billing and service computer. Additionally, this enhanced monitoring CPU provides the other functions of monitoring CPU and RAM 102 as discussed previously such as controlling operation of the monitoring system, storing flags and operating on the flags, and notification of the count value at appropriate times. Accordingly, in the photocopying monitoring system of FIG. 8a, there are two distinct portions of a monitoring system—a formatting portion 104 performed by the interface and a control portion 107a which performs the functions of personality module 106 and monitoring system CPU 102 as discussed above.

In a monitoring system as shown in FIG. 8b, which approximates monitoring system 90, the functions are more evenly split between the interface 104b and control 107b. In this embodiment, interface 104b formats the diagnostic signal and includes an EPROM and CPU for monitoring and translating the diagnostic signal. Control portion 107b includes a monitoring CPU and RAM including flags and is associated with an EPROM for controlling operation of the monitoring system, allowing transmittal of data such as copy count data to perform billing and preventive maintenance and notification that a malfunction has occurred as discussed in greater detail above.

A third photocopier system as shown in FIG. 8c includes an interface 104c which not only formats the signal and translates the diagnostic signal, but includes the flags and performs the function of monitoring CPU and RAM 102 as described in connection with photocopier monitoring system 90. In this embodiment, interface 104c acts as the interface, personality module and as the monitoring system CPU. Interface 104c outputs translated diagnostic signals when detected as well as the notification signals associated with the end of a billing cycle, preventive maintenance cycle or historic occurrences such as the end of the contract. This signal is provided to a control portion 107c which is no more than a CPU for controlling a modem for contacting the billing computer or service computer at the central station. This is in contrast to the embodiment of FIG. 8a in which the personality is contained away from the interface and the embodiment of FIG. 8b in which the personality module functions are found in the interface and the controlling functions are found in the CPU 102b.

The embodiment of FIG. 8c is particularly applicable to situations in which the entire monitoring system is manufactured internal to the photocopier to which this is to be applied. However, due to FCC regulations the modem must be external or externally reachable and therefore the modem and its CPU is located at a separate position.

In still another embodiment, the translating function is performed at the central billing and service computer. All that is transmitted for malfunctions are certain detected diagnostic signals. The central billing and service computer determines from the identification data the specifics of the photocopier being monitored and performs the translation function from its stored look up tables.

Figure 5:
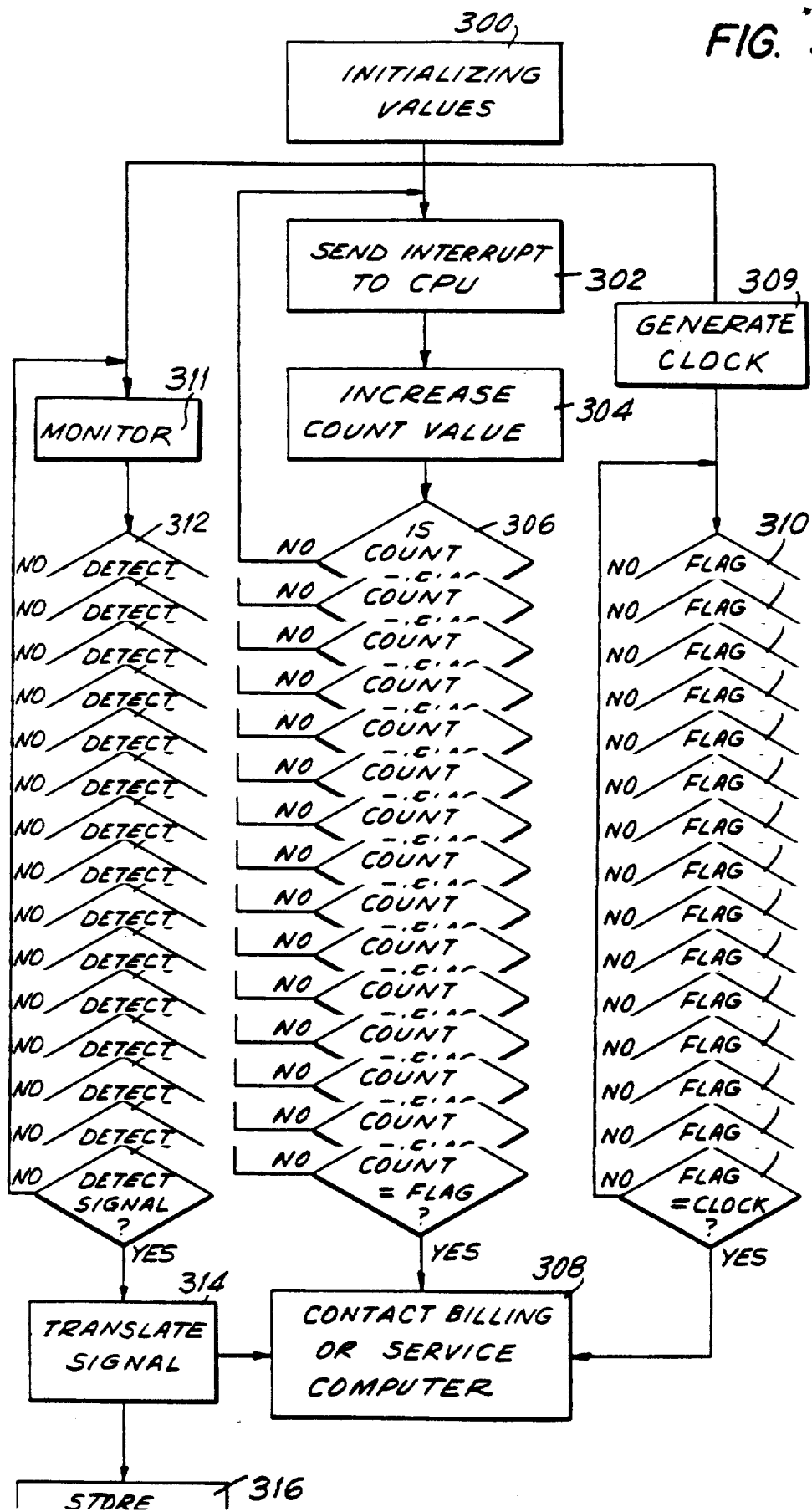
FIG. 5 is a flow chart illustrating the operation of the photocopier monitoring system in accordance with the invention.

Reference is now made to FIG. 5 wherein a flowchart illustrating the operation of photocopying monitoring system 90 is provided. Initially the appropriate flag values and phone numbers are stored as data in specified addresses of the RAM of monitoring CPU and RAM 102 in accordance with a step 300. A proper interface 104 is provided for translating the specific diagnostic signal of the photocopier to be monitored. EPROM 108 is selected to provide the desired functions for monitoring CPU and RAM 102. Counter monitor 100 sends an interrupt signal to monitoring CPU and RAM 102 each time a piece of paper is processed by the copier in accordance with a step 302. Monitoring CPU and RAM 102 increments a count value stored in its internal RAM each time an interrupt signal is received in accordance with a step 304. Monitoring CPU and RAM 102, utilizing the programs stored in EPROM 108, monitors this count value and compares the count value stored in its RAM to the flag value stored in its RAM in accordance with a step 306 to determine whether a billing cycle or preventive maintenance cycle has elapsed. When monitoring CPU and RAM 102 identifies a match between the incremented value in its RAM and the flag value stored in the RAM of monitoring system CPU and RAM 102 it contacts the appropriate billing or service computer in the central station through a modem 110 to inform the central station that preventive maintenance is required or that a billing cycle has elapsed.

As previously discussed monitoring system CPU 102 generates an internal real time clock in a step 309. Monitoring system CPU 102 in accordance with another program stored in EPROM 108 compares the predetermined billing and maintenance time cycle values stored as a flag in the RAM of monitoring system CPU 102 with the real time value generated within monitoring system CPU 102 in accordance with a step 310. When monitoring system CPU 102 identifies a match between a value being produced by the real time clock of monitoring CPU 102 and the flag value stored in the RAM of monitoring system CPU 102 monitoring system CPU 102 contacts the appropriate computer in step 308.

Simultaneously, in a step 311 interface 104 monitors the copier to detect the presence of any internal diagnostic signals being generated in a step 312. Upon detection of a diagnostic signal, interface 104 transmits the signals to monitoring CPU 102 which translates the signal into a form useable by the billing and service computers in a step 314. Monitoring system CPU 102 in accordance with step 308, contacts the billing and service computers at the central station through modem 110 and reports the identity of the copier, the time and date of the malfunction as well as a two or more digit code indicating the malfunction type. This information is then stored in the RAM as the last malfunction to occur in the copier in a step 316.

Photocopier monitoring system 90 may also be one of a number of photocopiers in a local area networks system as described above in connection with photocopier monitoring system 50. In such a system modem 110 would be replaced with a local area network such as a carrier current modem for communicating with the central monitoring CPU. The central monitoring CPU would be provided with EPROM which acts in a manner similar to EPROM 108, but at predetermined intervals. In accordance with polling programs contained in the central EPROM, central monitoring CPU polls each of the local monitoring CPUs 102 and stores that information in a RAM of central monitoring CPU which is larger than the RAM of each local monitoring CPU and RAM 102 and is constructed in parallel to retain the stored information of each local monitoring CPU and RAM 102.

The above monitoring systems were applied to photocopiers by way of example only. As the monitoring systems in accordance with the invention monitor the number of pages produced and internal diagnostic signals they are equally applicable to any printing or paper processing device such as a laser printer, facsimile device or the like.

It will thus be seen that the objects set forth above, among those made apparent from the preceding description, are efficiently attained and, since certain changes may be made in the above constructions without departing from the spirit and scope of the invention, it is intended that all matters contained in the above description and shown in the accompanying drawings shall be interpreted as illustrative and not in a limiting sense.

It is also to be understood that the following claims are intended to cover all the generic and specific features of the invention herein described and all statements of the scope of the invention in which, as a matter of language, might be said to fall therebetween.

What is claimed is:

1. A system for monitoring a paper processing device and reporting to a central station, the paper processing device including an internal diagnosing system for diagnosing malfunctions within the system, a display device for displaying the diagnosed malfunction, the diagnosing system providing an internal diagnostic signal specific to the printing device for causing the display device to display the malfunction comprising:

counter means for counting the number of papers processed by the printing device and producing a count signal corresponding to each paper processed;

first control means for receiving the count signal, totalling the count signal and transmitting the total count at at least one of a predetermined time interval and a predetermined count interval and producing a count trigger signal;

a single interface means for receiving the diagnostic signal at a single source without interfering with the operation of the display device, the first control means also receiving the diagnostic signal from the interface means and in response thereto producing a diagnostic trigger signal; and modem means for transmitting the total count signal to the central station upon receipt of said count trigger signal, the modem means also receiving the diagnostic trigger signal and transmitting the diagnostic signal in response thereto to the central station.

2. The monitoring system of claim 1, wherein the first control means includes a clock for determining the predetermined time interval.

3. The monitoring system of claim 1, further comprising memory means within the first control means for storing the diagnostic signal.

4. The monitoring system of claim 1, further comprising an input/output means for retrieving data stored within the first control means and inputting data through the modem to the central station.

5. The monitoring system of claim 3, further comprising an input/output means for retrieving data stored within the first control means and inputting the data through the modem to the central service station or memory means.

6. The monitoring system of claim 2, wherein the clock is a real time clock.

7. The monitoring system of claim I, further comprising a local area network for transmitting the total count signal from the first control means to the modem means.

8. The monitoring system of claim 7, further comprising second control means for receiving the total count signal from the local area network and transmitting the total count signal at a predetermined time to the modem means.

9. The monitoring system of claim 1, further comprising a local area network for receiving the total count signal and diagnostic signal and transmitting the total count signal and diagnostic signal and second control means for receiving the total count signal and diagnostic signal from the local area network and transmitting the total count signal at a predetermined time to the modem means.

10. The monitoring system of claim 9, further comprising memory means within the second control means for storing the diagnostic signal.

11. The monitoring system of claim 1, further comprising second control means for receiving the diagnostic signal and in response thereto producing a trigger signal and the modem means receiving the trigger signal and transmitting the diagnostic signal in response thereto to a central station.

12. The monitoring system of claim 11, wherein the monitoring system is adapted to transmit the diagnostic signal to the central station in response to a status signal received therefrom.

13. The monitoring system of claim 9, wherein the local area network is a telephone modem.

14. The monitoring system of claim 9, wherein the local area network is a carrier current modem.

15. The monitoring system of claim 9, wherein the local area network is a high frequency transmitter and receiver.

16. The monitoring system of claim 1, wherein the printing device is a photocopier.

17. A system for monitoring a paper processing device and reporting to a central station, the printing device including an internal diagnosing system for diagnosing malfunctions within the system, a display device for displaying the diagnosed malfunction, the diagnosing system providing an internal diagnostic signal specific to the printing device for causing the display device to display the malfunction comprising:

counter means for counting the number of papers processed by the printing device and producing a count signal corresponding to each paper processed;

first control means for receiving the count signal, totalling the count signal and transmitting the total count at at least one of a predetermined time interval and a predetermined count interval and producing a count trigger signal; the first control means including memory means for storing said predetermined total count; and interface means for receiving the diagnostic signal without interfering with the operation of the display device, the first control means also receiving the diagnostic signal from the interface means and in response thereto producing a diagnostic trigger signal;

modem means for transmitting the total count signal to the central station upon receipt of said count trigger signal, the modem means also receiving the diagnostic trigger signal and transmitting the diagnostic signal in response thereto to the central station;

third control means for causing the first control means to compare the total count to the predetermined count value and causing said first control means to produce said trigger signal when said total count equals said predetermined count.

18. The monitoring system of claim 17, wherein said third control means includes an EPROM.

19. The monitoring system of claim 18, wherein said EPROM is interchangeable.

20. The monitoring system of claim 2, wherein said time clock is a real time clock internally generated by said first control means.

21. The monitoring system of claim 20, wherein the first control means includes memory means for storing said predetermined time and further comprising third control means for causing the first control means to compare the real time clock value produced by said real time clock and said predetermined time to produce said trigger signal when said real time clock value equals said predetermined time.

22. The monitoring system of claim 21, wherein said third control means includes an EPROM.

23. The monitoring system of claim 22, wherein said EPROM is interchangeable.

24. The monitoring system of claim 1, wherein said first control means is a CPU.

25. The monitoring system of claim 1, wherein said count signal is an interrupt signal.

26. A system for monitoring a paper processing device and reporting to a central station, the printing device including an internal diagnosing system for diagnosing malfunctions within the system, a display device for displaying the diagnosed malfunction, the diagnosing system providing an internal diagnostic signal specific to the printing device for causing the display device to display the malfunction comprising:
 counter means for counting the number of papers processed by the printing device and producing a count signal corresponding to each paper processed;
 first control means for receiving the count signal, totalling the count signal and transmitting the total count at at least one of a predetermined time interval and a predetermined count interval and producing a count trigger signal;
 interface means for receiving the diagnostic signal without interfering with the operation of the display device, the first control means also receiving the diagnostic signal from the interface means and in response thereto producing a diagnostic trigger signal; said interface means being interchangeable; and
 modem means for transmitting the total count signal to the central station upon receipt of said count trigger signal, the modem means also receiving the diagnostic trigger signal and transmitting the diagnostic signal in response thereto to the central station.

27. The monitoring system of claim 17, wherein said predetermined total count may be reprogrammed from a remote location.

28. The monitoring system of claim 1, wherein the paper processing device includes a cable for internally transmitting the diagnostic signal and the interface means includes connector means for electrically connecting the interface means to the cable.

29. The monitoring system of claim 28, wherein the cable for internally transmitting the diagnostic signal is formed of at least two sections, one end of a first section of the cable having a first connector and one end of a second section of the cable having a second connector, the first connector being receivable within the second connector and the interface means comprising a board, a third connector mounted on the board for receiving the first connector, a fourth connector mounted on the board for receiving the second connector, the interface means providing an electrical connection therebetween and transmitting the diagnostic signal to both the first control means and the monitor display.

30. The monitoring system of claim 1, wherein said interface means translates said formatted diagnostic signal into a form used by the central station.

31. The monitoring system of claim 30, further comprising memory means within the first control means for storing the translated diagnostic signal.

32. The monitoring system of claim 30, wherein the central station transmits a status signal to the monitoring system to cause the monitoring system to transmit the translated diagnostic signal to the central station in response thereto.

33. A system for monitoring a paper processing device and reporting to a central station, the printing device including an internal diagnosing system for diagnosing malfunctions within the system, a display device for displaying the diagnosed malfunction, the diagnosing system providing an internal diagnostic signal specific to the printing device for causing the display device to display the malfunction comprising:
 counter means for counting the number of papers processed by the printing device and producing a count signal corresponding to each paper processed;
 first control means for receiving the count signal, totalling the count signal and transmitting the total count at at least one of a predetermined time interval and a predetermined count interval and producing a count trigger signal;
 interface means for receiving the diagnostic signal without interfering with the operation of the display device, the first control means also receiving the diagnostic signal from the interface means and in response thereto producing a diagnostic trigger signal; said interface means translating said formatted diagnostic signal into a form used by the central station;
 modem means for transmitting the total count signal to the central station upon receipt of said count trigger signal, the modem means also receiving the diagnostic trigger signal and transmitting the diagnostic signal in response thereto to the central station; and
 the paper processing device including a cable for internally transmitting the diagnostic signal produced of at least two sections, one end of a first section of the cable having a first connector and one end of a second section of the cable having a second connector, the first connector being receivable within the second connector and the interface comprising a board, a third connector mounted on the board for receiving the first connector, a fourth connector mounted on the board for receiving the second connector, the interface means providing an electrical connection therebetween and transmitting the diagnostic signal to both the first control means and the monitor display.

34. The copier monitoring system of claim 30, wherein said interface further includes an interface CPU for translating the internal diagnostic signal formed by the paper processing device.

35. The monitoring system of claim 30, wherein said interface means formats said diagnostic signal into a form used by the first control means.

36. The monitoring system of claim 1, wherein the printing device generates a count signal for causing the display device to display the count, and further comprises a cable for internally transmitting the count signal and the counter means includes connector means for electrically connecting the monitoring system to the cable.

37. The monitoring system of claim 36, wherein said counter means includes an optocoupler.

38. A system for monitoring a copier and reporting to a central station, a printing device including an internal diagnosing system for diagnosing malfunctions within the system, a display device for displaying the diagnosed malfunction, the diagnosing system providing an internal diagnostic signal specific to the printing device for causing the display device to display the malfunction comprising:
 a first monitoring system including counter means for counting the number of papers processed by a first copier and producing a count signal corresponding to each paper processed; control means for receiving the count signal, totalling the count signal and transmitting a total count signal at a predetermined time; interface means for receiving the diagnostic signal at a single source without interfering with the operation of the display device, the control means also receiving the diagnostic signal from the interface means and in response thereto producing a diagnostic trigger signal; and modem means for transmitting the total count signal to a central billing station and receiving said diagnostic trigger signal and transmitting said diagnostic signal to a central station in response thereto;

at least one additional system for monitoring a photocopier comprising counter means for counting the number of papers processed by at least a second copier producing a count signal corresponding to each paper processed; control means for receiving the count signal, totalling the count signal and transmitting a total count signal at a predetermined time; interface means for receiving the diagnostic signal at a single source without interfering with the operation of the display device, the control means also receiving the diagnostic signal from the interface means and in response thereto producing a diagnostic trigger signal; and modem means for transmitting the total count signal to a central billing station and receiving said diagnostic trigger signal and transmitting said diagnostic signal to a central station in response thereto; and computer means located at the billing station for receiving each respective total count signal from each respective copier monitoring system and producing a respective bill for each copier representing the number of papers processed by each respective copier.

39. The system for monitoring photocopiers of claim 38, wherein the computer means is adapted to send a signal to any one of the monitoring systems to cause the monitoring system to transmit the paper count information.

40. The system for monitoring photocopiers of claim 38 wherein the computer means sends a signal to any one of the monitoring systems a predetermined time after the non-occurrence or a signal from the monitoring system, the signal from the computer means requesting the status of the system.

41. The system for monitoring photocopiers of claim 38, wherein the computer means transmits a signal to at least one of the monitoring systems, and the control means of said at least one system transmits the total count to the central station in response thereto.

42. A system for monitoring a printing device and reporting to a central station comprising:

counter means for counting the number of papers processed by the printing device and producing a count signal corresponding to each paper processed;

first control means for receiving the count signal totaling the count signal and transmitting the total count at at least one of a predetermined time and a predetermined count and producing a trigger signal, the first control means including memory means for storing said predetermined total count;

modem means for contacting the central station upon receipt of said trigger signal; and second control means for comparing the total count to the predetermined count value and causing said first control means to produce said trigger signal when said total count equals said predetermined count.

43. A method for monitoring a printing device, the device including an internal diagnosing system for diagnosing malfunctions within the system, a display device for displaying the diagnosed malfunction, the diagnosing system providing internal diagnostic signals specific to the printing device for causing the display device to display the malfunctions comprising the steps of:

detecting each of said diagnostic signals at a single location;

translating a detected internal diagnostic signal to a signal which may be understood by a computer at a central station; and transmitting the translated signal to the central station.

44. The method of claim 43, further comprising the step of continuously monitoring the diagnosing system.

45. The method of claim 43, further comprising the step of transmitting a printing device identification number to the central station when transmitting the translated signal.

46. A method for monitoring a printing device, the device including an internal diagnosing system for diagnosing malfunctions within the system, a display device for displaying the diagnosed malfunction, the diagnosing system providing internal diagnostic signals specific to the printing device for causing the display device to display the malfunctions comprising the steps of:

detecting at least one selected internal diagnostic signal;

translating the selected internal diagnostic signal to a signal which may be understood by a computer at a central station;

transmitting the translated signal to the central station; and transmitting a last abort data to the central station when transmitting the translated signal.

47. The method of claim 46, wherein the last abort data includes the last printing device failure identified by month, day, year, hour, minute, seconds and a failure code.

48. The method of claim 43, wherein the printing device further includes a counter for providing interrupt signals upon detection of the processing of paper and further comprising the steps of:

detecting the interrupt signals;

counting the interrupt signals;

determining a total count value;

transmitting a signal to the central station when the total count value equals a predetermined count value.

49. The method of claim 46, further comprising the steps of:

generating a real time clock value;

storing a predetermined real time value;

transmitting a signal to the central station when the real time clock value equals the predetermined real time value.

* * * * *

UNITED STATES PATENT AND TRADEMARK OFFICE
CERTIFICATE OF CORRECTION

PATENT NO.  : 5,077,582
DATED       : December 31, 1991
INVENTOR(S) : Burt Kravette, et al It is certified that error appears in the above-indentified patent and that said Letters Patent is hereby corrected as shown below:

In the drawings, Sheet 5 of 7 consisting of Figure 5, should be deleted to be replaced with the new Sheet 5, consisting of Figures 5 and 6, as shown on the attached page.

Signed and Sealed this

Eleventh Day of January, 1994

Attest:

BRUCE LEHMAN

Attesting Officer

Commissioner of Patents and Trademarks